(12) United States Patent
Fasola et al.

(10) Patent No.: US 10,598,498 B2
(45) Date of Patent: Mar. 24, 2020

(54) METHODS AND SYSTEMS FOR LOCALIZATION OF A VEHICLE

(71) Applicant: GM GLOBAL TECHNOLOGY OPERATIONS LLC, Detroit, MI (US)

(72) Inventors: Juan Fasola, San Francisco, CA (US); Georgios Georgiou, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 151 days.

(21) Appl. No.: 15/947,706

(22) Filed: Apr. 6, 2018

(65) Prior Publication Data

US 2018/0224283 A1 Aug. 9, 2018

(51) Int. Cl.
*G01C 21/30* (2006.01)
*G05D 1/02* (2020.01)
*G06T 17/05* (2011.01)

(52) U.S. Cl.
CPC .......... *G01C 21/30* (2013.01); *G05D 1/0246* (2013.01); *G05D 1/0274* (2013.01); *G06T 17/05* (2013.01); *G05D 2201/0213* (2013.01)

(58) Field of Classification Search
CPC .... G01C 21/30; G05D 1/0246; G05D 1/0274; G05D 2201/0213; G06T 17/05
USPC ......................................................... 701/446
See application file for complete search history.

(56) References Cited

U.S. PATENT DOCUMENTS

| | | | |
|---|---|---|---|
| 2018/0005407 A1* | 1/2018 | Browning | .............. G01C 21/32 |
| 2019/0147254 A1* | 5/2019 | Bai | ........................ G01S 17/936 |
| | | | 382/104 |

* cited by examiner

*Primary Examiner* — Marthe Y Marc-Coleman
(74) *Attorney, Agent, or Firm* — Lorenz & Kopf, LLP (57) ABSTRACT

Systems and method are provided for localizing a vehicle. In one embodiment, a method includes: receiving, by a processor, sensor data from a sensor of the vehicle; filtering, by the processor, the sensor data for data associated with static elements of the environment; determining, by the processor, realtime height values associated with the static elements; correlating, by the processor, the realtime height values with defined height values associated with a map of the environment; localizing, by the processor, the vehicle on the map based on the correlated realtime height values and the defined height values; and controlling, by the processor, the vehicle based on the localizing.

20 Claims, 5 Drawing Sheets

METHODS AND SYSTEMS FOR LOCALIZATION OF A VEHICLE

INTRODUCTION

The present disclosure generally relates to autonomous vehicles, and more particularly relates to systems and methods for localizing an autonomous vehicle within a space.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicles determine their location, for example, within lane boundaries (referred to herein as localization), and use that location to navigate the vehicle. In some instances, it may be difficult to locate the vehicle within the lane boundaries. For example, during harsh environmental conditions such as snow or heavy rain, the lane boundaries may be undetectable and thus, the vehicle location within the lane may be undeterminable.

Accordingly, it is desirable to provide improved systems and methods for localizing an autonomous vehicle. It is further desirable to provide improved systems and method for localizing the vehicle based on sensor data from sensors already available on an autonomous vehicle. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for localizing a vehicle. In one embodiment, a method includes: receiving, by a processor, sensor data from a sensor of the vehicle; filtering, by the processor, the sensor data for data associated with static elements of the environment; determining, by the processor, realtime height values associated with the static elements; correlating, by the processor, the realtime height values with defined height values associated with a map of the environment; localizing, by the processor, the vehicle on the map based on the correlated realtime height values and the defined height values; and controlling, by the processor, the vehicle based on the localizing.

In various embodiments the method includes filtering a band of pixel data from the sensor data, wherein the band is defined by a height range, and a radius range from a position of the vehicle. In various embodiments the method includes determining the realtime height values is based on a maximum height value for each pixel in the pixel data. In various embodiments the sensor data is image data from a plurality of image sensors that sense the environment of the vehicle. In various embodiments the static elements comprise elements that are fixed to a ground of the environment. In various embodiments the realtime height values comprise maximum height values of the static elements in the environment.

In various embodiments the method includes performing a zero-mean normalized cross correlation between the realtime height values and the defined height values. In various embodiments the method includes computing a sum of squared distances between the realtime height values and the defined height values. In various embodiments the method includes applying a feature detector to the realtime height values to obtain a feature and projecting the feature to at least one cell where the feature is located.

In another embodiment, a system for localizing a vehicle is provided. The system includes: at least one sensor that generates sensor data associated with an environment of the vehicle; and a controller configured to, by a processor, filter the sensor data for data associated with static elements of the environment, determine realtime height values associated with the static elements, correlate the realtime height values with defined height values associated with a map of the environment, localize the vehicle on the map based on the correlated realtime height values and the defined height values, and control the vehicle based on the localizing.

In various embodiments, the controller filters the sensor data by filtering a band of pixel data from the sensor data, wherein the band is defined by a height range, and a radius range from a position of the vehicle.

In various embodiments, controller determines the realtime height values based on a maximum height value for each pixel in the pixel data. In various embodiments, the sensor data is image data from a plurality of image sensors that sense the environment of the vehicle. In various embodiments, the static elements comprise elements that are fixed to a ground of the environment. In various embodiments, the realtime height values comprise maximum height values of the static elements in the environment.

In various embodiments, the controller correlates by performing a zero-mean normalized cross correlation between the realtime height values and the defined height values. In various embodiments, the controller correlates by computing a sum of squared distances between the realtime height values and the defined height values. In various embodiments, the controller correlates by applying a feature detector to the realtime height values to obtain a feature and projecting the feature to at least one cell where the feature is located.

In still another embodiment a system for localizing a vehicle is provided. The system includes: a first non-transitory module that, by a processor, receives sensor data associated with an exterior environment of the vehicle and that filters the sensor data for data associated with static elements of the environment; a second non-transitory module that, by a processor, determines realtime height values associated with the static elements; a fourth non-transitory module that, by a processor, correlates the realtime height values with defined height values associated with a map of the environment; and a fifth non-transitory module that, by a processor, localizes the vehicle on the map based on the correlated realtime height values and the defined height values, and controls the vehicle based on the localizing.

In various embodiments, the first non-transitory module filters the sensor data by filtering a band of pixel data from the sensor data, wherein the band is defined by a height range, and a radius range from a position of the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
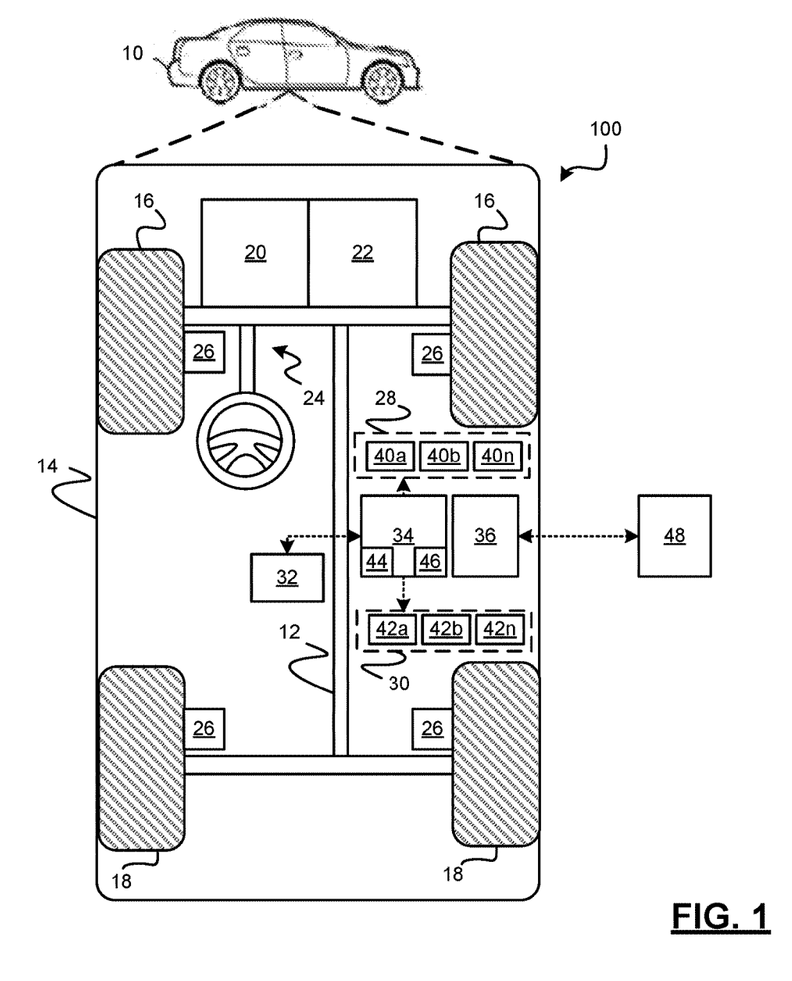
FIG. 1 is a functional block diagram illustrating an autonomous vehicle having a localization system, in accordance with various embodiments.

With reference to FIG. 1, a localization system shown generally at 100 is associated with a vehicle 10 in accordance with various embodiments. In general, the localization system 100 processes data provided by image sensors disposed about the vehicle 10 (as will be discussed in more detail below) to determine a height of certain static features in the environment. The localization system 100 establishes a realtime height map of the environment and correlates the realtime height map to a defined height map of the environment. The localization system 100 determines the vehicle location based on the correlation between the realtime height map and the defined height map of the environment. The vehicle 10 then intelligently controls the vehicle 10 based on the determined location.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the localization system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the autonomous vehicle 10 can be any level of automation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices 40a-40n include one or more image sensors that generate image sensor data that is used by the localization system 100.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
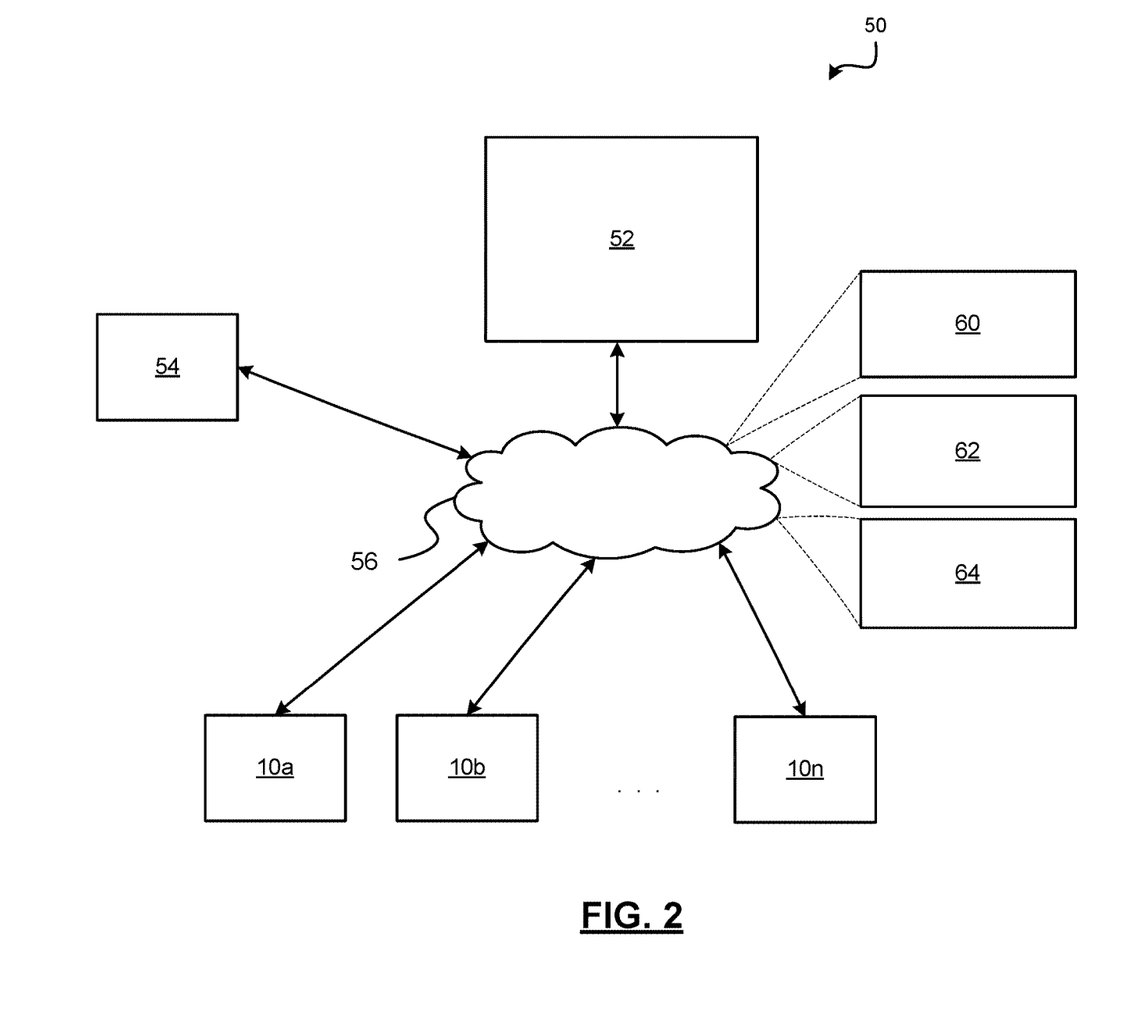
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. In various embodiments, the defined maps include height maps of the environment that are used by the localization system 100. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the localization system 100 and, when executed by the processor 44, process data from the image sensors to determine a height of certain static features in the environment; and determines the vehicle location based on a correlation between the determined realtime height of the features and a defined height of the static features in the environment.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
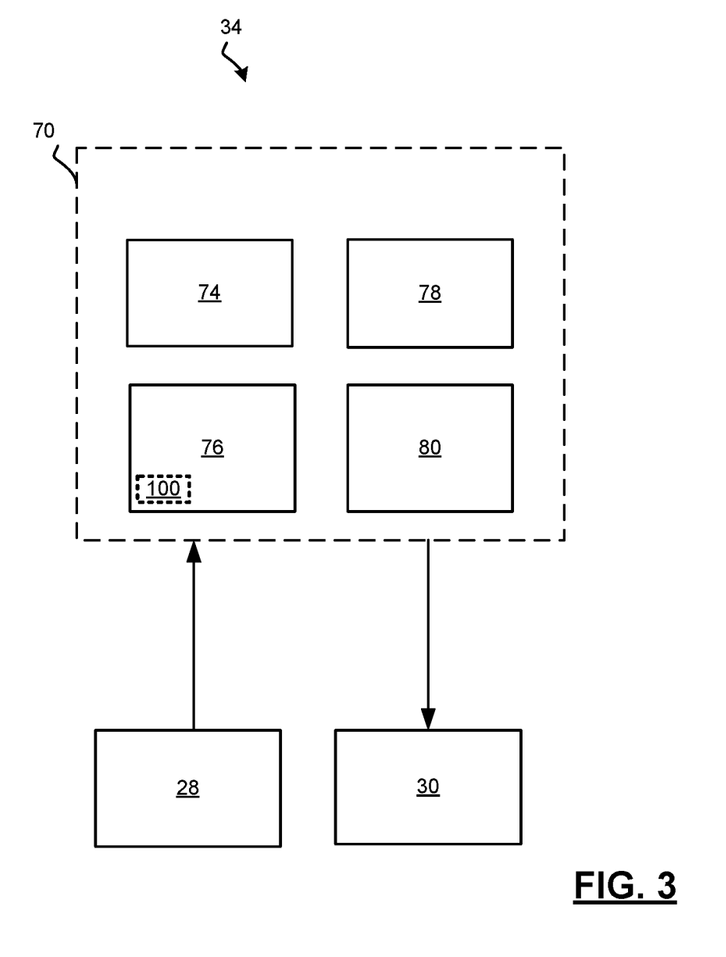
FIGS. 3 and 4 are dataflow diagrams illustrating an autonomous driving system that includes the localization system of the autonomous vehicle, in accordance with various embodiments.

In accordance with various embodiments, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the localization system 100 of FIG. 1 is included within the ADS 70, for example, as part of the positioning system 76. For example, the localization system 100 provides data to the positioning system 76 indicating an exact location of the vehicle 10 relative to the environment.

Figure 4:
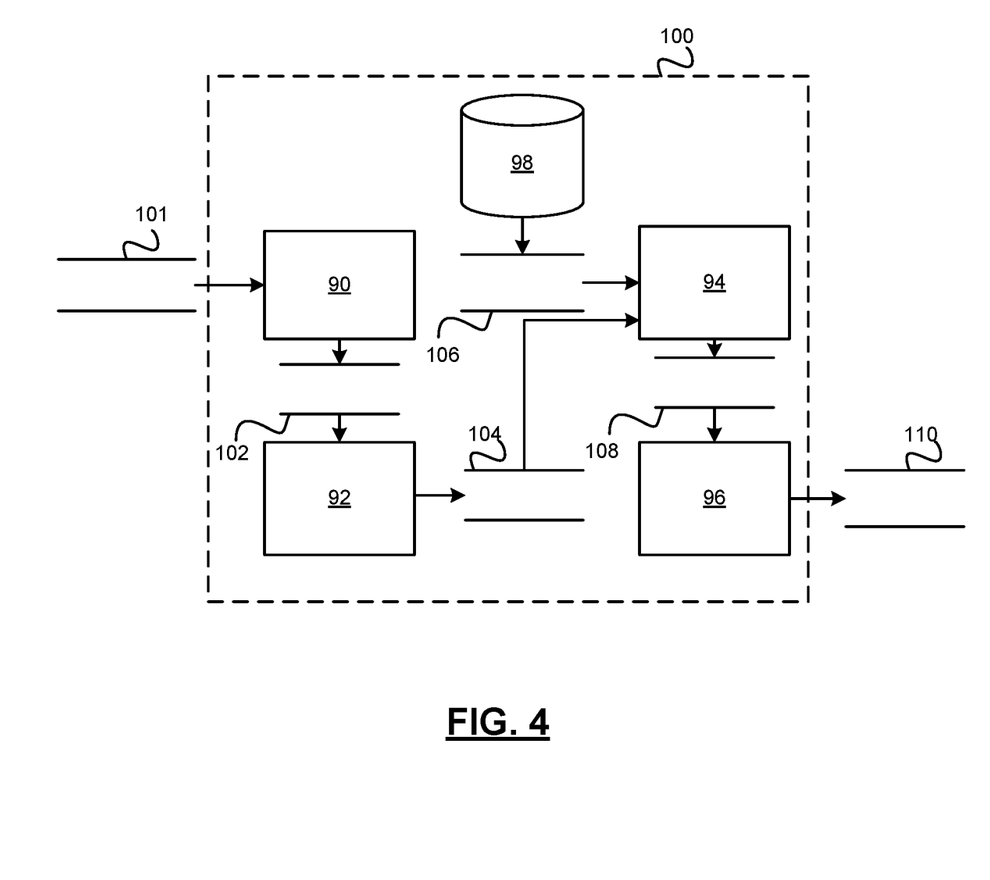

For example, as shown in more detail with regard to FIG. 4 and with continued reference to FIG. 3, the localization system 100 includes a data filtering module 90, a height data construction module 92, a correlation module 94, a localization module 96, and a height map datastore 98.

The height map datastore 98 stores maps of the navigable environment. The height map datastore stores height data for static elements in the environment. The static elements are elements fixed to the ground or that do not move or change in the environment. The height data is stored based on a position of the static elements relative to the map. The height data and the positions of the static elements may be predetermined and stored in the datastore 98 based on one or more height mapping techniques and is not limited to any one method.

The data filtering module 90 receives image data 101 from the image sensors. The data filtering module 90 processes the image data 101 using one or more filtering techniques to provide filtered data 102 that includes static elements. The static elements may include features that are fixed in the environment such as, but not limited to, stop signs or other signs, building facades, curbs, utility poles, etc.

In various embodiments, the data filtering module 90 filters the image data 101 by extracting data (X, Y, Z coordinates) that falls within a defined band surrounding the vehicle 10 (i.e., the vehicle 10 is the center point of the band). The band can be defined, for example, by a height range (a minimum height and a maximum height) and a radius range (a minimum radius and a maximum radius). For example, the height range can include values where static elements may typically occur (e.g., between just above the chassis to about 2.5 meters above the ground, or other values). In another example, the radius range can likewise include values where the static elements may typically occur (e.g., between 20 meters from the vehicle and 80 meters from the vehicle, or other values). As can be appreciated, other methods or values can be performed to filter out static elements in various embodiments.

The height data construction module 92 receives as input the filtered data 102. The height data construction module 92 determines realtime height data 104 from the filtered data 102. For example, the height data construction module 92 evaluates the band of data to determine a single height value (e.g., a maximum Z value in the X, Y, Z coordinate system, the mean Z value for a cell) for each X, Y pixel within the filtered data 102. The height value is then correlated with the X, Y coordinate associated with the pixel and provided as the realtime height data 104.

The correlation module 94 receives as input the realtime height data 104 and defined height data 106. The defined height data 106 may be retrieved from the datastore 98 based on a current location of the vehicle 10. For example, the defined height data 106 located in the map at geographical coordinates within a certain distance from a geographical coordinate of the vehicle 10 and/or along a current path of the vehicle 10 can be retrieved from the datastore 98.

The correlation module 94 then correlates the band of height values from the realtime height data 104 with the height values in the defined height data 106. For example, the correlation module 94 can perform a zero-mean normalized cross correlation that returns a correlation score between −1 (high negative correlation) and +1 (high positive correlation), with values around 0 indicating low levels of correlation. In another example, the correlation module 94 can compute a sum of squared distances between the mapped height values and the observed height values from the current environment around the vehicle, where the objective using this methodology would be to minimize the total score for a given X, Y range of candidate positions. In another example, the correlation module 94 can apply feature detectors to the raw height data (e.g. curb features, pole features, planar building façade features, etc.) and project the feature outputs to the X, Y cell where the features are located to be subsequently used in the correlation routines matching local features against the map. As can be appreciated, various correlation methods can be performed, in various embodiments, as the correlation module 94 is not limited to any one method. The correlation module 94 provides correlation data 108 (the distances between the values) based on the correlation between the values.

The localization module 96 receives as input the correlation data 108. The localization module 96 determines the location of the vehicle 10 relative to the defined map based on the correlation data 108. For example, the localization module 96 applies a kalman filter to the correlation data 108 to determine a final position of the band relative to the map. The localization module 96 then determines the position of the vehicle 10 on the map (the center of the band) based on the position of the band on the map. The localization module 96 then provides localization data 110 which may be used in control of and navigation of the vehicle 10.

Figure 5:
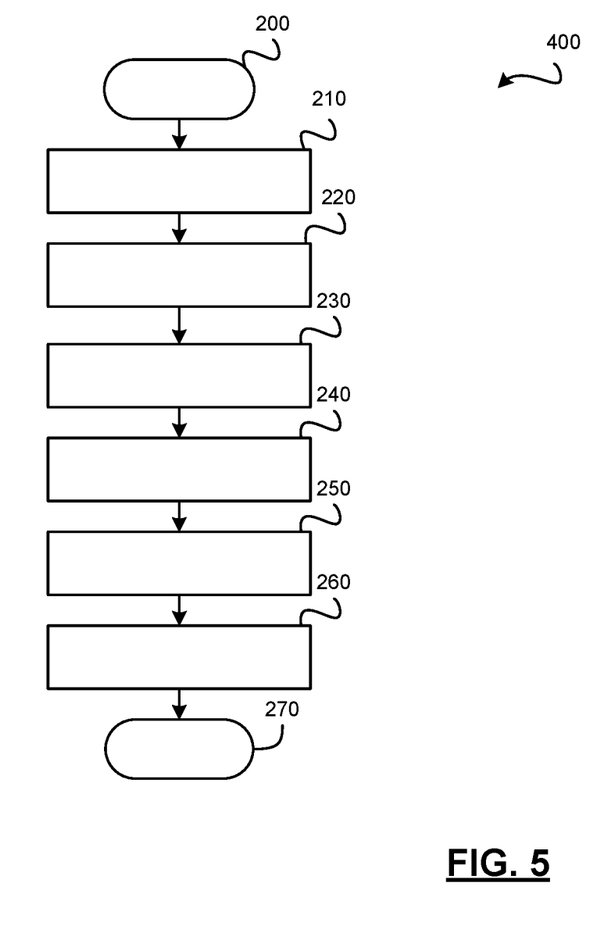
FIG. 5 is a flowchart illustrating a control method for controlling the autonomous vehicle, in accordance with various embodiments.

Referring now to FIG. 5, and with continued reference to FIGS. 1-4, a flowchart illustrates a control method 400 that can be performed by the localization system 100 of FIG. 1 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the method 400 can be scheduled to run based on one or more predetermined events, and/or can run continuously during operation of the autonomous vehicle 10.

In one embodiment, the method may begin at 200. The image data 101 is received from the sensor system 28 at 210. The image data 101 is filtered for static elements in the environment, for example, as discussed above at 220. The filtered data 102 is processed to determine realtime height data 104 of the static elements, for example, as discussed above at 230. The defined height data 106 is then retrieved and correlated with the realtime height data 104, for example, as discussed above at 240. A kalman filter (or other filtering methods—e.g. particle filters) is applied to the correlation data 108 to determine a final vehicle position at 250. Thereafter, the method may end at 270.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for localizing a vehicle, comprising:
   receiving, by a processor, sensor data from a sensor of the vehicle;
   filtering, by the processor, the sensor data for data associated with static elements of the environment;
   determining, by the processor, realtime height values associated with the static elements;
   correlating, by the processor, the realtime height values with defined height values associated with a map of the environment;
   localizing, by the processor, the vehicle on the map based on the correlated realtime height values and the defined height values; and
   controlling, by the processor, the vehicle based on the localizing,
   wherein the correlating comprises at least one of:
   performing a zero-mean normalized cross correlation between the realtime height values and the defined height values;
   computing a sum of squared distances between the realtime height values and the defined height values; and
   applying a feature detector to the realtime height values to obtain a feature and projecting the feature to at least one cell where the feature is located.

2. The method of claim 1, wherein the filtering comprises filtering a band of pixel data from the sensor data, wherein the band is defined by a height range, and a radius range from a position of the vehicle.

3. The method of claim 2, wherein the determining the realtime height values is based on a maximum height value for each pixel in the pixel data.

4. The method of claim 1, wherein the sensor data is image data from a plurality of image sensors that sense the environment of the vehicle.

5. The method of claim 1, wherein the static elements comprise elements that are fixed to a ground of the environment.

6. The method of claim 5, wherein the realtime height values comprise maximum height values of the static elements in the environment.

7. The method of claim 1, wherein the correlating comprises the performing the zero-mean normalized cross correlation between the realtime height values and the defined height values.

8. The method of claim 1, wherein the correlating comprises the computing the sum of squared distances between the realtime height values and the defined height values.

9. The method of claim 1, wherein the correlating comprises the applying the feature detector to the realtime height values to obtain the feature and projecting the feature to at least one cell where the feature is located.

10. A system for localizing a vehicle, comprising:
    at least one sensor that generates sensor data associated with an environment of the vehicle; and
    a controller configured to, by a processor, filter the sensor data for data associated with static elements of the environment, determine realtime height values associated with the static elements, correlate the realtime height values with defined height values associated with a map of the environment, localize the vehicle on the map based on the correlated realtime height values and the defined height values, and control the vehicle based on the localizing,
    wherein the controller is configured to correlate based on at least one of:
    performing a zero-mean normalized cross correlation between the realtime height values and the defined height values;
    computing a sum of squared distances between the realtime height values and the defined height values; and
    applying a feature detector to the realtime height values to obtain a feature and projecting the feature to at least one cell where the feature is located.

11. The system of claim 10, wherein the controller filters the sensor data by filtering a band of pixel data from the sensor data, wherein the band is defined by a height range, and a radius range from a position of the vehicle.

12. The system of claim 11, wherein the controller determines the realtime height values based on a maximum height value for each pixel in the pixel data.

13. The system of claim 10, wherein the sensor data is image data from a plurality of image sensors that sense the environment of the vehicle.

14. The system of claim 10, wherein the static elements comprise elements that are fixed to a ground of the environment.

15. The system of claim 14, wherein the realtime height values comprise maximum height values of the static elements in the environment.

16. The system of claim 10, wherein the controller correlates by the performing the zero-mean normalized cross correlation between the realtime height values and the defined height values.

17. The system of claim 10, wherein the controller correlates by computing the sum of squared distances between the realtime height values and the defined height values.

18. The system of claim 10, wherein the controller correlates by the applying the feature detector to the realtime height values to obtain a feature and the projecting the feature to at least one cell where the feature is located.

19. A system for localizing a vehicle, comprising:
    a first non-transitory module that, by a processor, receives sensor data associated with an exterior environment of the vehicle and that filters the sensor data for data associated with static elements of the environment;
    a second non-transitory module that, by a processor, determines realtime height values associated with the static elements;
    a fourth non-transitory module that, by a processor, correlates the realtime height values with defined height values associated with a map of the environment, wherein the fourth non-transitory module correlates based on at least one of:

performing a zero-mean normalized cross correlation between the realtime height values and the defined height values;

computing a sum of squared distances between the realtime height values and the defined height values; and applying a feature detector to the realtime height values to obtain a feature and projecting the feature to at least one cell where the feature is located; and a fifth non-transitory module that, by a processor, localizes the vehicle on the map based on the correlated realtime height values and the defined height values, and controls the vehicle based on the localizing.

20. The system of claim 19, wherein the first non-transitory module filters the sensor data by filtering a band of pixel data from the sensor data, wherein the band is defined by a height range, and a radius range from a position of the vehicle.

* * * * *